United States Patent [19]

Weimer et al.

[11] Patent Number: 5,219,804
[45] Date of Patent: Jun. 15, 1993

[54] PROCESS FOR PREPARING ULTRAFINE ALUMINUM NITRIDE POWDER

[75] Inventors: Alan W. Weimer; Gene A. Cochran; John P. Henley; Glenn A. Eisman, all of Midland, Mich.

[73] Assignee: The Dow Chemical Company, Midland, Mich.

[21] Appl. No.: 819,425

[22] Filed: Jan. 10, 1992

[51] Int. Cl.$^5$ .................. C01B 21/072; C04B 35/58
[52] U.S. Cl. ........................ 501/96; 423/412; 501/97; 501/98
[58] Field of Search ................ 423/412; 501/96, 97, 501/98

[56] References Cited

U.S. PATENT DOCUMENTS

| | | | |
|---|---|---|---|
| 4,610,857 | 9/1986 | Ogawa et al. | 423/335 |
| 4,612,045 | 9/1986 | Shintaku | 75/68 |
| 4,812,166 | 3/1989 | Saiki et al. | 75/0.5 |
| 4,877,759 | 10/1989 | Holt et al. | 423/412 |
| 5,126,121 | 6/1992 | Weimer et al. | 423/412 |

FOREIGN PATENT DOCUMENTS

| | | |
|---|---|---|
| 36-21164 | 11/1961 | Japan . |
| 275472 | 9/1986 | Japan . |
| 62-17161 | 1/1987 | Japan . |
| 195102 | 8/1988 | Japan . |
| 277503 | 11/1988 | Japan . |
| 297206 | 12/1988 | Japan . |
| 1-226709 | 9/1989 | Japan . |
| 1-308812 | 12/1989 | Japan . |
| 1-308813 | 12/1989 | Japan . |
| 2-26811 | 1/1990 | Japan . |
| 2-26812 | 1/1990 | Japan . |
| 2283604 | 11/1990 | Japan . |
| 2283605 | 11/1990 | Japan . |
| 3109268 | 5/1991 | Japan . |

OTHER PUBLICATIONS

Kazuhiro, et al. *Synthesis and properties of ultrafine AlN powder by rf plasma* Appl. Phys. Lett. 54(23), Jun. 5, 1989.

N. Hotta et al., *Continuous Synthesis and Properties of Fine AlN Powder by Floating Nitridation Technique*, Nippon Ceramics, 96[7], 731–35 (1988) date unavailable.

Primary Examiner—Wayne Langel
Attorney, Agent, or Firm—D. R. Howard

[57] ABSTRACT

Rapidly heat powdered aluminum, an admixture of powdered aluminum and a compatible solid material, a powdered admixture of alumina and carbon, or aluminum nitride powder having a surface area lower than desired in the presence of a source of nitrogen at a temperature of 2473 to 3073K to produce aluminum nitride, then promptly quench the aluminum nitride product. The product has a surface area of greater than 10 m$^2$/g, preferably greater than 15 m$^2$/g.

12 Claims, No Drawings

PROCESS FOR PREPARING ULTRAFINE ALUMINUM NITRIDE POWDER

BACKGROUND OF THE INVENTION

The present invention generally concerns a process for preparing aluminum nitride powder. The present invention more particularly concerns preparing aluminum nitride powder that has a surface area greater than 10 square meters per gram ($m^2/g$), desirably greater than 15 $m^2/g$.

Aluminum nitride synthesis generally occurs via one of four known processes. One well known process involves carbothermally reducing and nitriding alumina ($Al_2O_3 + 3C + N_2 \rightarrow 2AlN + 3CO$). A second well known process directly reacts aluminum metal with nitrogen ($2Al + N_2 \rightarrow 2AlN$). A less common process reacts aluminum chloride and ammonia in a vapor phase ($AlCl_3 + 4NH_3 \rightarrow AlN + 3NH_4Cl$). U.S. Pat. No. 3,128,153 discloses an even less common process wherein aluminum phosphide reacts with ammonia ($AlP + NH_3 \rightarrow AlN + 1/4P_4 + 3/2H_2$).

The carbothermal reduction reaction is endothermic and requires approximately 335 kilojoules per gram-mole of aluminum nitride at 1873K. The reaction is generally carried out at a temperature within a range of 1673 to 1973K as disclosed by Kuramoto et al. in U.S. Pat. No. 4,618,592. The resultant aluminum nitride powder is fine enough to allow consolidation to near theoretical density via pressureless sintering in the presence of sintering aids. Higher temperatures generally result in the formation of sintered agglomerates of aluminum nitride particles. The agglomerates are not amenable to densification by pressureless sintering.

The direct reaction of aluminum metal to aluminum nitride is exothermic and generates approximately 328 kilojoules per gram-mole of aluminum nitride at 1800K. Aluminum metal melts at about 933K. The reaction of aluminum and nitrogen starts at about 1073K. The reaction, once initiated, is self-propagating if not controlled. An uncontrolled reaction can reach aluminum nitride sintering temperatures and remain at these temperatures for extended periods of time. The uncontrolled reaction typically yields sintered aluminum nitride agglomerates having a surface area, as determined by Brunauer-Emmett-Teller (BET) analysis, of less than 2 $m^2/g$. The agglomerates are not readily amenable to further sintering to densities approaching theoretical density via pressureless sintering techniques. See e.g., F. Skeele et al., "Evaluation of Properties/Performance Relationships for Aluminum Nitride," *Ceramic Transactions, Ceramic Powder Science III*, 885–893 (1990).

One variation of the direct nitridation process employs plasma reactors to vaporize aluminum metal at temperatures approaching 10,000K and produce ultrafine aluminum nitride particles. The vaporized metal then reacts with nitrogen, ammonia, or mixtures of nitrogen and ammonia or nitrogen and hydrogen. The resultant aluminum nitride particles have an average particle size of less than 0.1 micrometer and a surface area of approximately 30 $m^2/g$. Baba et al., in "Synthesis and Properties of Ultrafine AlN Powder by RF Plasma", *Applied Physics Letters*, 54 (23), page 2309 (1989), show that these powders can be pressureless sintered to near theoretical density at temperatures as low as 1873K.

SUMMARY OF THE INVENTION

One aspect of the present invention is a direct nitridation process for preparing aluminum nitride powder that has a surface area of greater than 10 $m^2/g$. The process comprises passing particulate aluminum metal and a nitrogen source through a heated reaction zone, the zone being maintained at a temperature sufficient to individually heat substantially all of the aluminum metal particles at a heating rate of at least about 100K per second to a temperature within a temperature range of from about 2473K to about 3073K, at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least 75 percent by weight, based upon product weight, the aluminum nitride having a surface area of greater than 10 $m^2/g$.

A second aspect of the present invention is a direct nitridation process for preparing a composite or mixture of aluminum nitride powder and a powdered compatible material wherein the aluminum nitride has a surface area of greater than 10 $m^2/g$. The process comprises passing a nitrogen source and an admixture of a powdered compatible solid material and particulate aluminum metal through a heated reaction zone, the compatible solid material being present in an amount sufficient to yield a material containing aluminum nitride and the compatible material, the zone being maintained at a temperature sufficient to individually heat substantially all of the admixture particles at a heating rate of at least about 100K per second to a temperature within a temperature range of from 2473K to about 3073K, at a rate of flow sufficient to maintain substantially all of the admixture particles within said temperature range for a time period of from about 0.2 to about 10 seconds, the time period being sufficient to convert at least 75 percent by weight of the particulate aluminum metal to aluminum nitride, the aluminum nitride having a surface area within a range of greater than 10 $m^2/g$. The product beneficially has an aluminum nitride content of at least about 90 percent by weight, based upon product weight.

A third aspect of the present invention is a carbothermal process for preparing aluminum nitride powder that has a surface area greater than 10 $m^2/g$. The process comprises passing a nitrogen source and a powdered admixture of alumina and carbon through a heated reaction zone, the reaction zone being maintained at a temperature sufficient to individually heat substantially all of the powdered admixture particles at a heating rate of at least about 100K per second to a temperature within a temperature range of from about 2473K to about 3073K, at a rate of flow sufficient to maintain substantially all of the powdered admixture particles within said temperature range for a time period of from about 0.2 to about 20 seconds, the time period being sufficient to convert the powdered admixture to a produce having an aluminum nitride content of at least 75 percent by weight, based upon product weight, the aluminum nitride having a surface area of greater than 10 $m^2/g$.

In an aspect related to the first three aspects, the product passes from the heated reaction zone into a cooling zone that is maintained at a temperature sufficient to individually cool substantially all product particles at a cooling rate of at least about 100K per second to a temperature below 1073K. The product must be cooled rapidly in order to minimize, if not eliminate, partial sintering or agglomeration of product particles. Partial sintering may interfere with subsequent pressureless sintering efforts. Agglomeration may lead to unacceptably low product surface areas.

In a related aspect, the product can be passed through the heated reaction zone one or more additional times to increase the yield of aluminum nitride. The product can be passed through either alone or in conjunction with an amount of the powdered admixture.

A fourth aspect of the present invention is a process to convert aluminum nitride having a surface area of less than 15 $m^2/g$ to aluminum nitride having a surface area greater than or equal to 15 $m^2/g$. The process comprises passing a nitrogen source and powdered aluminum nitride that has a surface area of less than 15 $m^2/g$ through a heated reaction zone that is maintained at a temperature sufficient to individually heat substantially all of the aluminum nitride particles at a heating rate of at least about 100K per second to a temperature within a temperature range of from greater than 2473K to about 3073K, at a rate of flow sufficient to maintain substantially all of the aluminum nitride particles within said temperature range for a period of time sufficient to dissociate the aluminum nitride into aluminum and nitrogen as dissociation products and thereafter passing the dissociation products into a cooling zone that is maintained at a temperature sufficient to convert the dissociation products into aluminum nitride particles having a surface area of greater than 15 $m^2/g$ and individually cool substantially all of said particles at a cooling rate of at least about 100K per second to a temperature below 1073K.

DETAILED DESCRIPTION OF THE INVENTION

The process of the present invention is suitably carried out in an apparatus like that disclosed in co-pending application, Ser. No. 07/152,613, filed Feb. 5, 1988. The teachings of the co-pending application are incorporated herein by reference. The reactor disclosed in the co-pending application comprises four principal components: a cooled reactant transport member; a reactor chamber; a heating means; and a cooling chamber. A purge gas may be introduced into spaces surrounding the reactor chamber.

The transport member may be likened to a conduit disposed within a gas flow space that is desirably annular. The transport member is suitably maintained at a temperature below that at which powdered aluminum metal melts for the first and second aspects of the invention. Similar temperatures suffice for the third aspect of the invention. The temperature is beneficially sufficient to substantially preclude the powdered reactants, particularly aluminum metal and aluminum oxide, from melting and coalescing either within the transport member or proximate to its exit. Accordingly, the temperature is desirably sufficient to allow substantially all of the powdered reactants to enter the reactor chamber as discrete particles. A temperature below the melting point of aluminum (about 933K) yields satisfactory results. The range is beneficially from about 275 to about 373K, desirably from about 275 to about 323K, and preferably from about 275 to about 298K.

The powdered reactants, whether they be aluminum metal, an admixture of powdered aluminum metal and a powdered compatible material, or a powdered admixture of alumina and carbon, are suitably fed into the transport section via a powder feeding mechanism. Aluminum nitride having a surface area of less than 15 $m^2/g$ may be fed in the same manner. The powder feeding mechanism is not particularly critical so long as it provides a metered or controlled flow of powdered material to the transport section. As such, the feeding mechanism may be a single screw feeder, a twin screw feeder, a vibratory feeder, a rotary valve feeder or some other conventional feeder.

The powdered aluminum metal and the compatible materials are suitably the same as those disclosed in co-pending application Ser. No. 07/695,376, filed May 3, 1991. The relevant teachings of the co-pending application are incorporated herein by reference.

The powdered aluminum metal should have a purity greater than about 97 percent and a weighted mean particle size less than about 500 micrometers. The compatible solid material is suitably aluminum nitride or a fine ceramic powder that, when mixed with the AlN product, forms a desirable powdered admixture or composite product powder. Suitable ceramic powders include silicon carbide, boron nitride, boron carbide, titanium diboride, silicon nitride, titanium nitride, titanium carbide, tungsten carbide or tantalum nitride. The fine ceramic powder used as a compatible material beneficially has a purity of greater than 98%, a surface area of from about 10 to about 30 $m^2/g$ and a particle size within a range of from about 0.01 to about 1 micrometer. Aluminum nitride, when used as a compatible material, is suitably a portion of the aluminum nitride product.

Admixtures having a compatible material content of from about 20 to about 95 percent by weight of admixture weight yield beneficial results. The compatible material content is desirably from about 28 to about 91 percent by weight and preferably from about 33 to about 67 percent by weight, based upon admixture weight.

The aluminum oxide used in the present invention suitably has a particle size within a range of from about 0.05 to about 20 micrometers and a purity greater than about 99.8 percent. The range is beneficially from about 0.2 to about 2 micrometers. The purity is desirably greater than about 99.97 percent. Higher purities, e.g., 99.99 percent or greater, will produce satisfactory products, but at a greater cost.

The carbon is suitably a material selected from the group consisting of acetylene black, plant carbon, thermal black, coke, carbon black and graphite. The material is beneficially carbon black or graphite.

The admixtures may be prepared by using a conventional mixing apparatus. Illustrative apparatus include ribbon blenders, roller mills, vertical screw mixers, V-blenders, and fluidized zone mixers such as that sold under the trade designation FORBERG ™.

The powder feed rate varies with reactor design and capacity as well as the powdered reactants. By way of illustration, an acceptable feed rate for powdered aluminum is from about 0.02 to about 0.5 kilograms per minute for a reactor having a reaction zone volume of 2.16 cubic feet (0.06 cubic meter). Acceptable feed rates for reactors having greater reaction zone volumes are readily determined without undue experimentation.

Gaseous nitrogen is fed into the transport section in an amount and at a rate of flow sufficient to satisfy two requirements. First, the flow rate should be at least stoichiometric, i.e. sufficient to satisfy the relevant equation. The equation is $2Al+N_2\rightarrow 2AlN$ for the direct nitridation reaction and $Al_2O_3+3C+N_2\rightarrow 2AlN+3CO$ for the carbothermal reaction. The flow rate should also be sufficient to entrain either the powdered reactants or low (less than 15 $m^2/g$) surface area aluminum nitride powder prior to the entry of the low surface area aluminum nitride powder or the powdered reactants into the reactor chamber. The flow rate is suitably at least one and one-half times stoichiometric. The flow rate is beneficially between one and one-half and four times stoichiometric, desirably between one and one-half and three times stoichiometric. An excessively high flow rate decreases residence time of powdered material, either the reactants or the low surface area aluminum nitride powder, within the reaction zone and, in turn, reactor capacity. The flow rate for the carbothermal reaction is typically greater than that for the direct nitridation reaction. By way of illustration, a suitable flow rate for the direct nitridation reaction might be 3 standard cubic feet per minute (SCFM) whereas a suitable flow rate for the carbothermal reaction might be 4 SCFM.

Gaseous nitrogen is also fed into the gas flow space. This gas flows from the gas flow space into the reactor chamber. In doing so, it acts to minimize, if not substantially eliminate, contact of powdered reactants with reactor chamber surfaces near their juncture with the transport member exit. Such contact is undesirable because these surfaces tend to be at temperatures which promote coalescence of the powdered reactants, particularly aluminum metal and aluminum oxide. Coalescence leads, in turn, to cessation of operations due to reactor plugging.

The gaseous nitrogen should be as pure as possible. Moisture and residual oxygen impurities adversely affect aluminum nitride product quality. The nitrogen dew point is beneficially less than about 233K and desirably less than about 193K. Oxygen impurity levels are beneficially less than about 5 and desirably less than about 1 part per million parts of gas. If the moisture content is too high, it may be necessary to pass the gaseous nitrogen through a drying bed or desiccant. The gas may also be purified by conventional means to reduce the residual oxygen content.

The nitrogen flow rates control residence time of the aluminum metal powder, the admixture of a powdered compatible solid material and particulate aluminum, or the powdered admixture of alumina and carbon within the reaction zone. The nitrogen flow rates also control residence time of the low surface area aluminum nitride powder within that zone. When aluminum metal powder, either alone or in admixture with a powdered compatible solid material, is added to the reaction zone, the residence time is suitably within a range of from about 0.2 second to about 10 seconds, beneficially from about 2 to about 8 seconds and desirably from about 4 to about 6 seconds. Residence times of less than about 0.2 seconds tend to yield an incompletely converted product containing unreacted metal. Residence times in excess of 10 seconds produce no great advantage in terms of conversion percentage. When low surface area aluminum nitride is added to the heated reaction zone, the same residence times provide satisfactory results. When the powdered admixture of alumina and carbon is added to the reaction zone, the residence time is suitably within a range of from about 0.2 second to about 20 seconds, beneficially from about 2 to about 16 seconds and desirably from about 4 to about 15 seconds. Residence times of less than 0.2 seconds do not provide a satisfactory aluminum nitride product yield. Residence times in excess of 20 seconds offer no substantial advantage in terms of conversion percentage.

Ammonia may be used instead of, or in addition to, gaseous nitrogen. A mixture of gaseous nitrogen and hydrogen may also be used instead of pure gaseous nitrogen.

The entrained flow of powdered reactants or low surface area aluminum nitride powder enters the reaction zone in a form approximating that of a well dispersed dust cloud. The powdered reactants or low surface area aluminum nitride powder particles are heated almost instantly by gas convective and conductive heat transfer and by thermal radiation from reactor walls which define the heated reaction zone. The reaction zone is beneficially maintained at a temperature within a range of from about 2473 to about 3073K. The temperature range is desirably from about 2473 to about 2773K. Temperatures below 2473K lead to aluminum nitride products with surface areas of 8 $m^2/g$ or less. The actual temperature within the reaction zone may be determined by optical pyrometry or other suitable means.

The reactor walls may be heated either indirectly by radiation from heating elements spaced around them, inductively via an inductive coil, or directly by electrical resistance. The powdered reactants or low surface area aluminum nitride powder particles are heated at rates within a range of from about 100 to about 10,000,000K per second. The range is beneficially from about 1000 to about 10,000,000K per second, desirably from about 10,000 to about 1,000,000K per second. The rate at which an individual particle is heated varies in response to a number of factors. The factors include its size, its proximity to the source of heat and density of the dust cloud. The rate should not, however, be so low that substantial coalescence of reactant particles can occur during a melting phase prior to reaching reaction temperatures. In the case of low surface area aluminum nitride particles, the rate should not be so low that the aluminum nitride passes into the cooling zone without being substantially dissociated into nitrogen and aluminum as dissociation products.

The gaseous nitrogen flow that provides an entrained flow of powdered reactants into the reaction zone also provides an entrained flow of powdered aluminum nitride or, in the case of low surface area aluminum nitride feed material, dissociation products out of the reaction zone. The entrained flow or dust cloud of aluminum nitride powder or the entrained flow of dissociation products beneficially exits the reaction zone and almost immediately enters a cooling zone. It is believed that the dissociation products recombine to form aluminum nitride powder having a surface area in excess of 15 $m^2/g$ at or near the cooling zone entrance. The cooling zone quenches or rapidly cools the aluminum nitride powder below its reaction temperature. Rapid cooling helps maintain the very fine particle size of aluminum nitride particles that form upon cooling below the dissociation temperature (about 2473K) of aluminum nitride. Cooling rates within the cooling zone beneficially approximate the heating rates within the reaction zone. The cooled walls of the cooling zone and cooled gas tend to rapidly deplete remaining amounts of sensible heat from the aluminum nitride particles. If cooling does not occur at a sufficiently rapid rate, aluminum nitride particles tend to fuse or sinter together, thereby resulting in formation of undesirable agglomerates or large grains of aluminum nitride product. The fused particles tend to have surface areas much lower than 10 m²/g. Actual cooling times vary depending upon factors such as particle size, cooling zone configuration and gas flow rates. The cooled aluminum nitride particles are suitably collected and processed by conventional technology.

The aluminum nitride product has a surface area that is beneficially greater than 10 m²/g when powdered reactants are used as a starting material and greater than 15 m²/g when low surface area aluminum nitride powder is used as the starting material. The surface area is desirably within a range of greater than 15 to about 65 m²/g. The range is preferably from about 19 to about 60 m²/g.

The following examples are solely for purposes of illustration and are not to be construed as limiting the scope of the invention. All parts and percentages are by weight unless otherwise stated.

EXAMPLE 1

Direct Nitridation at 2473K

A six inch (0.152 meter) inside diameter by 11 feet (3.35 meters) long heated zone vertical graphite tube furnace is brought to and maintained at a temperature of 2200 degrees Centigrade (2473K) as measured by optical pyrometers.

High purity aluminum metal powder, commercially available from Aluminum Company of America (Alcoa) under the trade designation 7123, is loaded into an overhead feed hopper which is purged with nitrogen gas. The aluminum powder, nominally 99.97% pure, has a surface area of 0.449 square meters per gram, an oxygen content of 0.223 percent by weight, a silicon content of 75 parts per million (ppm), a calcium content of less than 10 ppm, a chromium content of less than 10 ppm, an iron content of of 44 ppm and a mean particle size of 18 micrometers. The nitrogen gas has a dew point of less than −80 degrees Centigrade (193K) and an oxygen content of less than one ppm.

The powdered aluminum is conveyed from the hopper to the top of the heated zone tube furnace via a loss-in-weight twin screw feeder connected to a reactant transport member like that described in co-pending application Ser. No. 07/152,613, previously incorporated by reference, at a rate of 0.2 pounds (0.09 kilogram) per minute. The reactant transport member is maintained at a temperature of 283K. Nitrogen gas flows through the reactant transport member at a rate of three standard cubic feet per minute (SCFM) (85 standard liters per minute, SLM) thus sweeping the aluminum powder with it into the top of the heated zone. An additional one SCFM (28.3 standard liters per minute) of nitrogen gas flows through the gas flow space within which the transport member is disposed and into the top of the furnace. The flow of gas is sufficient to provide the powder with an average residence time in the heated zone of about 4.3 seconds accounting for the decrease in nitrogen flow due to reaction and the conversion to AlN. The characteristic heating time for the feed aluminum particles equate to an estimated heating rate of approximately $10^5$K/second.

The submicron product powder is swept through the cooling zone by approximately 3 SCFM (85 SLM) of unreacted $N_2$ exiting the reaction zone. The calculated residence time in the cooling zone was approximately 3.2 minutes.

Product powder from the reactor is collected downstream from a cooling zone and analyzed. The cooling zone has an inside diameter of 18 inches (45.7 cm), a length of six feet (1.8 meters) and a volume of 10.6 cubic feet (0.3 cubic meters). Coolant maintained at a temperature of 283K and flowing through a jacket surrounding the cooling zone cools the product powder and gas to a measured temperature of approximately 303K. The rate of cooling approximates the rate of heating. An x-ray diffraction pattern of the product indicates that the powder is substantially aluminum nitride, but contains some unreacted metal. The oxygen and nitrogen contents of powder placed into a glove box with a nitrogen atmosphere immediately following synthesis are determined by a LECO analyzer to be, respectively, 0.16 weight percent and 27.1 weight percent. The nitrogen content equates to an aluminum nitride content of 79 weight percent. The powder has an unmilled aggregate BET surface area of about 15.1 m²/g.

The product powder is dry ball milled for two hours using AlN media to break up light agglomerates of product. The term "light agglomerates" describes agglomerates which break apart readily when rubbed between thumb and fingers with minimal pressure. The BET surface area after ball milling is 15.7 m²/g. Taking into account about 21 weight percent of unreacted aluminum with an estimated surface area of 0.5 m²/g, the aluminum nitride has a calculated weighted average surface area of about 19.7 m²/g.

COMPARATIVE EXAMPLES A AND B

Direct Nitridation at Temperatures Below 2473K

The process of Example 1 is replicated save for reducing the temperature at which the heated zone of the vertical reactor is maintained at 1600° C. (1873K) for Comparative Example A and 2100° C. (2373K) for Comparative Example B. Table I shows the respective analytical results and surface area measurements for the resultant product powders. Table I also includes corresponding results from Example 1.

TABLE I

EFFECT OF TEMPERATURE ON PRODUCT SURFACE AREA

| Example/ Comparative Example | Temperature (Kelvin) | Time (Seconds) | Oxygen Content (Weight %) | Nitrogen Content (Weight %) | Aluminum Nitride Content (Weight %) | Aluminum Nitride Surface Area (m²/g) |
|---|---|---|---|---|---|---|
| 1 | 2473 | 4.3 | 0.16 | 27.1 | 79 | 19.7 |
| A | 1873 | 5.4 | 0.60 | 31.6 | 93 | 4.2 |
| B | 2373 | 4.3 | 0.14 | 25.5 | 75 | 5.5 |

The data in the table demonstrate that product surface area can be increased by increasing the reaction temperature to the dissociation temperature for aluminum nitride. Similar results are expected at temperatures up to about 3073K, albeit with greater surface areas.

COMPARATIVE EXAMPLE C

Carbothermal Process at 2223K

The apparatus of Example 1 is used to convert a powdered admixture of alumina and carbon black to aluminum nitride via a carbothermal reduction-nitridation reaction. The powdered admixture is prepared from 25 pounds (lb) (11.4 kg) of acetylene carbon black and 62 lb (28.2 kg) of alumina. The alumina, commercially available from Aluminum company of America under the trade designation A16-SG, has a surface area of 9.46 square meters per gram. The carbon, commercially available from Chevron Chemical Company under the trade designation Shawinigan TM acetylene black, has a surface area of 67 square meters per gram. The alumina and carbon black are blended by ball milling for four hours.

Two hundred pounds (90.8 kg) of deionized water is loaded into a 55 gallon (208 liter) plastic drum. The following components are added to the water and mixed for 5 minutes: 1.5 liters of Triton ® X-100, an alkylphenoxy(polyethoxy)ethanol, commercially available from Rohm & Haas Co.; 40 milliliters (ml) of Arquad ® C-50, a coco-alkyltrimethyl quaternary ammonium chloride, commercially available from Akzo Chemicals, Inc.; and 150 ml of Antifoam TM B, a silicone product, commercially available from Dow Corning Corporation. The solution pH is adjusted to a a pH of 3.5 by adding 20 ml of a 65% nitric acid solution. Thirty five pounds (15.9 kg) of the ball milled admixture are added to the deionized water solution then stirred for 30 minutes before adding 17.75 lb (8.06 kg) of a 20% colloidal alumina solution with continued agitation. The solution is agitated for an additional two hours before it is spray dried while maintaining an outlet temperature of 403K. The spray dried powder has a carbon content of 26.6% as determined by analysis using a LECO model IR-412 with a Model HF-400 furnace.

The spray dried powder is loaded into the feed hopper and purged with nitrogen gas. The furnace is brought to and maintained at a temperature of 2173K. Nitrogen flows into the reaction zone at the same rate as in Example 1. The powder is metered into the cooled reactant transport member at a rate of 0.2 lb/minute (0.09 kg/min) as in Example 1. The flow rate provides an approximate residence time of 3.2 seconds. The product powder is collected downstream from the cooling zone as in Example 1. The powder is reloaded into the hopper and passed through the reaction zone a second time while the furnace is at a temperature of 2123K. The reloading is replicated two additional times save for increasing the temperature to 2223K to provide a total residence time of about 13 seconds.

X-ray diffraction analysis of the product shows that it is substantially aluminum nitride. A portion of the product is placed in a furnace and heated at 1123K for 2 hours in the presence of air to remove residual carbon. The heated product is analyzed to contain 1.1% carbon, 8.0% oxygen and 32.0% nitrogen, indicating an aluminum nitride content of about 82%. The BET surface area is about 6.0 $m^2/g$.

EXAMPLE 2

Carbothermal Process at 2573K

The remaining product from Comparative Example C is loaded into the feed hopper and passed through the heated reaction zone. The furnace is heated to and maintained at 2573K for this pass. The residence time in the reaction zone is about 3.0 seconds.

The powder, after heat treatment as in Comparative Example C, contains 0.6% carbon, 8.7% oxygen and 31.7% nitrogen, indicating an aluminum nitride content of about 80.9%. The BET surface area is about 52.6 $m^2/g$.

By contrasting Example 2 with Comparative Example C, the beneficial increase in surface area by operating above the dissociation temperature of aluminum nitride is readily apparent. Similar results are expected by eliminating the low temperature passes of Comparative Example C and using one or more passes at temperatures at or above the dissociation temperature. Suitable temperatures and other operating parameters are disclosed herein.

What is claimed is:

1. A process for preparing aluminum nitride powder that comprises passing particulate aluminum metal and a nitrogen source through a heated reaction zone, the zone being maintained at a temperature sufficient to individually heat substantially all of the aluminum metal particles at a heating rate of at least about 100K per second to a temperature within a temperature range of from 2473K to about 3073K, at a rate of flow sufficient to maintain substantially all of the aluminum metal particles within said temperature range for a time period of from about 0.2 to about 10 seconds, the time period being sufficient to convert the particulate aluminum metal to a product having an aluminum nitride content of at least 75 percent by weight, based upon product weight, the aluminum nitride having a surface area of greater than 10 $m^2/g$.

2. The process of claim 1 further comprising a sequential step wherein the particulate product is passed into a cooling zone after it exits the heated reaction zone and quenched to a temperature below that at which particulate aluminum metal is converted to aluminum nitride.

3. The process of claim 2 wherein the product is quenched within a time of from about 0.1 second to about 4 minutes after said product exits the heated reaction zone.

4. The process of claim 2 wherein the cooling rate is at least 100K per second.

5. A process for preparing a composite or mixture of aluminum nitride powder and a powdered compatible material that comprises passing an admixture of a powdered compatible solid material and particulate aluminum metal and a nitrogen source through a heated reaction zone, the compatible solid material being present in an amount sufficient to yield a composite material containing aluminum nitride and the compatible material, the zone being maintained at a temperature sufficient to individually heat substantially all of the admixture particles at a heating rate of at least about 100K per second to a temperature within a temperature range of from 2473K to about 3073K, at a rate of flow sufficient to maintain substantially all of the admixture particles within said temperature range for a time period of from about 0.2 to about 10 seconds, the time period being sufficient to convert at least 75 percent by weight of the particulate aluminum metal to aluminum nitride, the aluminum nitride having a surface area of greater than 10 $m^2/g$.

6. The process of claim 5 wherein the compatible material is aluminum nitride.

7. The process of claim 5 wherein the compatible material is aluminum nitride, silicon carbide, boron nitride, boron carbide, titanium diboride, silicon nitride, titanium nitride, titanium carbide, tungsten carbide or tantalum nitride.

8. A carbothermal process for preparing aluminum nitride powder having a surface area greater than 10 $m^2/g$, the process comprising passing a nitrogen source and a powdered admixture of alumina and carbon through a heated reaction zone, the reaction zone being maintained at a temperature sufficient to individually heat substantially all of the powdered admixture particles at a heating rate of at least about 100K per second to a temperature within a temperature range of from about 2473K to about 3073K, at a rate of flow sufficient to maintain substantially all of the powdered admixture particles within said temperature range for a time period of from about 0.2 to about 20 seconds, the time period being sufficient to convert the powdered admixture to a product having an aluminum nitride content of at least 75 percent by weight, based upon product weight, the aluminum nitride having a surface area of greater than 10 $m^2/g$.

9. The process of claim 8 further comprising a sequential step wherein the particulate product is passed into a cooling zone after it exits the heated reaction zone and quenched to a temperature below that at which particulate aluminum metal is converted to aluminum nitride.

10. The process of claim 9 wherein the product is quenched within a time of from about 0.1 second to about 4 minutes after said product exits the heated reaction zone.

11. The process of claim 9 wherein the cooling rate is at least 100K per second.

12. A process that converts aluminum nitride having a surface area of less than 15 $m^2/g$ to aluminum nitride having a surface area greater than or equal to 15 $m^2/g$ comprising passing a nitrogen source and powdered aluminum nitride that has a surface area of less than 15 $m^2/g$ through a heated reaction zone that is maintained at a temperature sufficient to individually heat substantially all of the aluminum nitride particles at a heating rate of at least about 100K per second to a temperature within a temperature range of from greater than 2473K to about 3073K, at a rate of flow sufficient to maintain substantially all of the aluminum nitride particles within said temperature range for a period of time sufficient to dissociate the aluminum nitride into aluminum and nitrogen as dissociation products and thereafter passing the dissociation products into a cooling zone that is maintained at a temperature sufficient to convert the dissociation products into aluminum nitride particles having a surface area of greater than or equal to 15 $m^2/g$ and individually cool substantially all of said particles at a cooling rate of at least about 100K per second to a temperature below 1073K.

* * * * *